(12) United States Patent
Morris et al.

(10) Patent No.: US 7,313,315 B2
(45) Date of Patent: Dec. 25, 2007

(54) METHODS AND APPARATUS FOR MAKING AND REPLAYING DIGITAL VIDEO RECORDINGS, AND RECORDINGS MADE BY SUCH METHODS

(75) Inventors: Octavius J. Morris, Redhill (GB); Declan P. Kelly, Eindhoven (NL); Wilhelmus J. Van Gestel, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1026 days.

(21) Appl. No.: 09/817,971

(22) Filed: Mar. 27, 2001

(65) Prior Publication Data

US 2001/0026561 A1 Oct. 4, 2001

(30) Foreign Application Priority Data

Mar. 31, 2000 (GB) ................................ 0007870.9

(51) Int. Cl.
*H04N 5/91* (2006.01)
(52) U.S. Cl. ............................ 386/95; 386/98; 386/112
(58) Field of Classification Search ................. 386/46, 386/95, 98, 125, 126
See application file for complete search history.

(56) References Cited

U.S. PATENT DOCUMENTS

| | | | | |
|---|---|---|---|---|
| 6,470,135 B1 * | 10/2002 | Kim et al. | ..................... | 386/68 |
| 6,512,882 B1 * | 1/2003 | Teunissen | .................... | 386/70 |
| 6,628,890 B1 * | 9/2003 | Yamamoto et al. | ........... | 386/68 |

FOREIGN PATENT DOCUMENTS

EP 0726574 8/1996

(Continued)

OTHER PUBLICATIONS

Patent Abstracts of Japan; 08317339 A; Nov. 29, 1996; Takimoto Hideki.

(Continued)

*Primary Examiner*—Huy Nguyen (57) ABSTRACT

Broadcast data received in MPEG Transport Stream format (TS) is processed (8) to produce a modified transport stream for recording on an optical disc (3) to record the content of a selected audio-visual program. Various techniques are disclosed for permitting random access within the recording, but without re-packetizing or remultiplexing the audio and video elementary streams, for example into program stream format. The received TS (DVIN) occasionally includes stream mapping information (PAT/PMT) identifying a transport packet ID code associated with each elementary stream, said stream mapping information being subject to change throughout the received TS. The packet IDs in the modified transport stream can be re-mapped to a uniform set of values to permit random entry to the recorded stream. Alternatively, the current stream mapping information may be inserted at every potential entry point in the modified stream. Characteristic point information (CPI) defining a set of potential entry points throughout the stream is generated by parsing the received stream, and recorded in a separate file to facilitate location of entry points on the disk. Entry points may for example comprise all I-pictures, or a subset of them. Clock reference values (PCR) not carried in one of the wanted streams are inserted in the modified transport stream using a separate packet ID. The recorded stream can be passed to a standard decoder with little or no further modification.

34 Claims, 5 Drawing Sheets

FOREIGN PATENT DOCUMENTS

| | | |
|---|---|---|
| EP | 0833514 | 4/1998 |
| EP | 0942426 | 9/1999 |
| EP | 0944086 | 9/1999 |
| WO | WO9212599 | 7/1992 |
| WO | WO0000981 | 1/2000 |
| WO | WO0028544 | 5/2000 |

OTHER PUBLICATIONS

Patent Abstracts of Japan; 10336585 A; Dec. 18, 1998; Nakashika Masahiro.

* cited by examiner

METHODS AND APPARATUS FOR MAKING AND REPLAYING DIGITAL VIDEO RECORDINGS, AND RECORDINGS MADE BY SUCH METHODS

The present invention relates to methods and apparatuses for the recording and subsequent playback of digital video data, and to recordings made by such methods and apparatuses. The invention finds particular application for example in the recording of multiplexed audio/video data streams from digital TV broadcasts. Such broadcasts presently adopt a Transport Stream format in compliance with the MPEG-2 specification (ITU_T recommendation H.222.0|ISO/IEC 13818-1). Compliance with that specification is not essential to the invention, however.

The MPEG-2 specification mentioned above specifies generic methods for multimedia multiplexing, synchronisation and timebase recovery for use in transmitting, recording and reproducing digital video (including audio) programmes. The specifications provide a packet based multimedia multiplexing where each elementary bit stream (video, audio, other data) is segmented into a Packetised Elementary Stream (PES), and then respective packets are multiplexed into either of two distinct stream types. Program Stream (PS) is a multiplex of variable length PES packets and designed for use in error free environments, such as recording on disc. Transport Stream (TS) consists of 188 byte fixed length packets, has functionality of multiple programme multiplexing as well as multiplexing of various PES packets of one programme, and is designed for use in error-prone environments such as broadcast. The multimedia synchronisation and timebase recovery are achieved by time-stamps for system time clock and presentation/decoding. In either case, the streams encode audio and especially video data in a compressed format, such that it is not possible to enter the stream at an arbitrary location, and find data valid for decoding.

One known system for the distribution of video programmes is Digital Versatile Disc (DVD). This standard defines a specific form of MPEG-2 Program Stream for storage of motion pictures and related material on optical disc. While DVD provides presently for the distribution of pre-recorded material, there is clearly a demand for both commercial and domestic audio and/or video (A/V) equipment capable of recording digital A/V data from broadcasts and home-recorded material, just as the popular video cassette tape systems currently in use permit recording of analogue A/V material.

Consumers of digital systems will expect equal and in fact superior facilities from a digital recording system, in terms of playing time, random access, indexing and so forth. Many proposals have been made to contribute to such a system. Mention is made in particular of our co-pending application WO 00/28544 (PHN 17161), not published at the priority date of the present application) which describes a system of characteristic point information (CPI) to identify entry and exit point from a recorded stream, without the need to parse the stream. Users will expect seamless editing and smooth playback of A/V data. Techniques for seamless editing which can be applied to recordings made by the present invention are disclosed in our co-pending International Patent application claiming priority from United Kingdom patent application 0007868.3 filed 31$^{st}$ Mach 2000, and entitled "Methods and Apparatus For Editing Digital Video Recordings, and Recordings Made By Such Methods" (PHNL 000181), not published at the priority date of the present application, and WO-A-00/00981 (PHB 34262 WO).

As mentioned above, the MPEG specification assumes that PS format will be used for recorded programmes, while TS is used in the established broadcast formats such as DVB. For the purposes of recording programmes from broadcasts, therefore, there is the possibility to convert TS to PS for recording, and then convert PS to TS for playback via digital channels. Such conversion requires demultiplexing and remultiplexing the streams, with regard to different buffer constraints and the like, which is expensive in terms of computational power and the hardware required for buffering. Moreover, future 'interactive TV' applications may be compromised if domestic recording formats adopt a fundamentally different approach to the original broadcast.

Other proposals have therefore been made to record the broadcast format, or rather one programme selected from it, "transparently". In these solutions, packets corresponding to an elementary stream (an audio or video stream) of the required programme are simply recorded in sequence on the tape (or disc) with a time-stamp to indicate the time at which they should be replayed. Using the time-stamps, the recording device can stream the recorded programme back to a decoder and play back the broadcast programme. As one example, EP-A-0944086 proposes a system for recording a selected programme from a broadcast TS. The document in particular explains methods for adapting clock reference (PCR) values from the full-bandwidth TS multiplex (from satellite, say) into the lesser-bandwidth stream containing selected programme only of the TS recording being made.

Unfortunately there are limitations of the transparent TS recording approach which become apparent when one adopts a random access medium.

For example, the designer may wish to implement fast-forward (or reverse) play by skipping rapidly through the sequence of pictures to find and extract the I-pictures only and send them to a decoder. The broadcast format (MPEG-2 Transport Stream) gives no guarantee that the packet identification field (PID) will be constant during a recording. Thus as we skip through the stream we do not know which packets to find unless we examine the stream sequentially. As another example, it is apparently assumed in EP-A-0944086 that PCR data is at least included in the data relating to the selected programme, when this is not the case.

It is an object of this invention to enable the provision of methods and apparatus for the recording of data streams such as MPEG-2 TS while preserving the utility of the popular analogue video recording formats.

It is a further and alternative object to realise fully the enhanced flexibility of random access storage media such as optical discs, when recording digitally from broadcast formats such as DVB.

In particular, the inventors have sought to provide conversion of broadcast TS format streams into a format suitable for recording and random access, without the burden of conversion to PS format.

In a first aspect, the invention provides a method of processing data received in a transport stream format to produce a modified transport stream for recording on a recording medium to record the content of a selected audio-visual programme (hereinafter referred to as the wanted content), the received transport stream comprising a multiplex of elementary streams conveying not only the wanted content but also the content of other programmes not to be recorded (the unwanted content), said elementary streams of data having been encoded, divided into elementary stream (ES) packets with packet headers, the ES packets further sub-divided into a plurality of smaller transport packets, and the transport packets of the first and second elementary streams interleaved in the received transport stream with each other and with transport packets carrying data from neither stream, wherein the said modified transport stream is produced by:

identifying and selecting received transport packets which correspond to the wanted content;

recording the selected transport packets within a recording medium to form said modified transport stream, so as to preserve compliance with a transport stream target decoder model substantially without re-packetising or remultiplexing the streams; and recording auxiliary information on the same recording medium for use by a reproducing apparatus in gaining access to the content of the modified transport stream via any of a set of potential entry points throughout the wanted content.

In one embodiment, said auxiliary information includes information stored in a file separately from a file holding the modified transport stream, and comprises an index listing characteristic points within at least one of the wanted elementary streams. This avoids parsing the elementary stream during playback to identify individual entry points.

The received transport stream may include stream mapping information identifying a transport packet ID code associated with each elementary stream, said stream mapping information being used to identify the wanted content and being subject to change throughout the received transport stream. In one such embodiment, current mapping information is inserted in the modified stream at each potential entry point. Alternatively, packet IDs may be re-mapped by modifying packet headers, so that the recording as a whole uses a predefined packet ID for each type of stream (audio, video, teletext etc).

A second aspect of the invention provides a method of processing a received data stream to produce a modified stream for recording on a recording medium to record the content of a selected audio-visual programme (hereinafter referred to as the wanted content), the received data stream comprising a multiplex of elementary streams conveying not only the wanted content but also the content of other programmes not to be recorded (the unwanted content), the method comprising:

identifying and extracting from the received data stream the elementary data stream(s) conveying the wanted content;

identifying in the received data an elementary stream conveying auxiliary data useful in playback of the programme to be recorded;

in the case where the elementary stream conveying the auxiliary data is one conveying part of the unwanted content, generating a new elementary stream conveying the auxiliary data without that part of the unwanted content; and multiplexing together the elementary stream(s) extracted from the received stream with the new elementary stream to form said modified data stream for recording.

The auxiliary data may for example comprise clock reference data (PCR) for synchronising playback of the audio-visual programme.

The invention in these and other aspects further provides methods of reproducing recorded data streams, and apparatuses for recording and reproducing such recordings, and recordings and signals as produced by such methods. Certain of these aspects and optional features of the invention are recited in the appended claims and others will be apparent from a consideration of the description of embodiments which follows.

It will be understood that the invention is applicable beyond the strict confines of MPEG-2 compliant streams, as similar considerations will generally arise when recording any coded multiplexed streams, especially from broadcast.

Embodiments of the invention will now be described, by way of example only, with reference to the accompanying drawings in which.

DIGITAL VIDEO RECORDING

General

The following description considers in particular A/V devices operating according to the MPEG standards (ISO/IEC 11172 for MPEG1 and, in particular, ISO/IEC 13818 for MPEG2) although the skilled practitioner will recognise the applicability of the present invention to other A/V coding schemes not in conformance with the MPEG standard.

Figure 1:
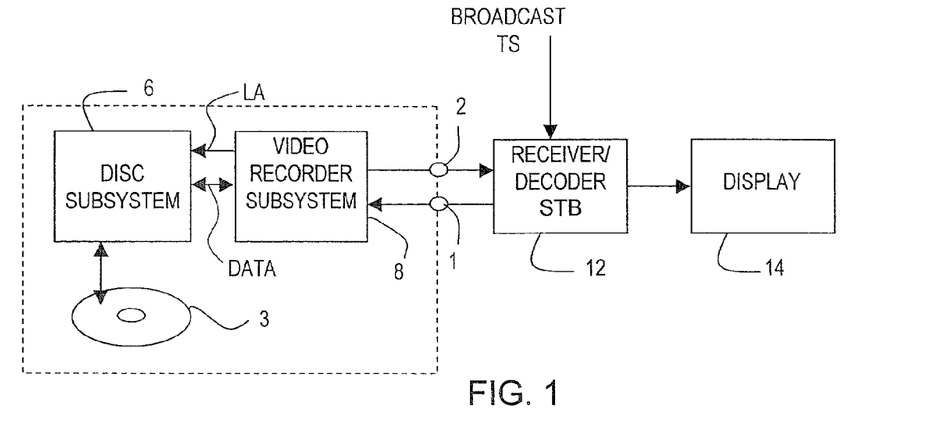
FIG. 1 is a block schematic representation of an A/V installation including novel optical disc record/replay apparatus embodying the present invention.

FIG. 1 shows within the dashed box an embodiment of an apparatus suitable to host the present invention, in the form of an optical disc record and playback device. In the description of the apparatus, the handling of frame-based video signals is concentrated upon, although it will be recognised that other types of signal may alternately or additionally be processed, such as audio or data signals, and that the invention is equally applicable to other memory devices such as magnetic data storage tapes and hard disc drives.

The apparatus comprises an input terminal 1 for receiving a digital video signal to be recorded on optical disc 3. Further, the apparatus comprises an output terminal 2 for supplying a digital video signal reproduced from the disc. These terminals may in use be connected via a digital interface such as IEEE 1394 to a digital TV receiver and decoder 12 in the form of a "set-top box" (STB), which also receives broadcast signals from satellite, cable or the like, in MPEG TS format. The decoder provides display signals to a display device 14, which may be a conventional analogue TV set.

The data area of the disc 3 consists of a contiguous range of physical sectors, having corresponding sector addresses. This address space is divided into sequence areas, with a sequence area being a contiguous sequence of sectors. The video recording apparatus as shown in FIG. 1 is decomposed into two major system parts, namely the disc subsystem 6 and what is referred to herein as the video recorder subsystem 8, controlling both recording and playback. The two subsystems are characterised by a number of features, as will be readily understood, including that the disc subsystem can be addressed transparently in terms of logical addresses (LA) and can guarantee a maximum sustainable bit-rate for reading and/or writing data from/to the disc.

Suitable hardware arrangements for implementing such an apparatus are known generally to the skilled person, with one example illustrated in the above-mentioned WO-A-00/00981 (PHB 34262 WO). The apparatus generally comprises signal processing units, a read/write unit including a read/write head configured for reading from/writing to optical disc 3. Actuators position the head in a radial direction across the disc, while a motor rotates the disc. A microprocessor is present for controlling all the circuits in known manner.

Many individual operations must be performed synchronously in order to make and reproduce digital video recordings, as will be described in more detail below. Broadly speaking, signal processing is performed in a manner adapted to convert the video data received via the input terminal 1 into blocks of information in the channel signal: the size of the blocks of information can be variable but may (for example) be between 2 MB and 4 MB. A block of information of the channel signal is written in a sequence area on the disc 3. The information blocks corresponding to the original video signal are written into many sequence areas that are not necessarily contiguous, as may be seen in the recording diagram of FIG. 3, which arrangement is known as fragmented recording. It is a characteristic of the disc sub-system that it is able to record and write such fragmented recordings fast enough to meet real-time deadlines, provided that certain allocation rules are met when the recordings are made.

In order to enable editing of the video data recorded in an earlier recording step on the disc 3, the apparatus is further operable to generate the bridging sequence to link two video streams, as is described in our co-pending application claiming priority from GB 0007868.3, mentioned above.

Figure 2:
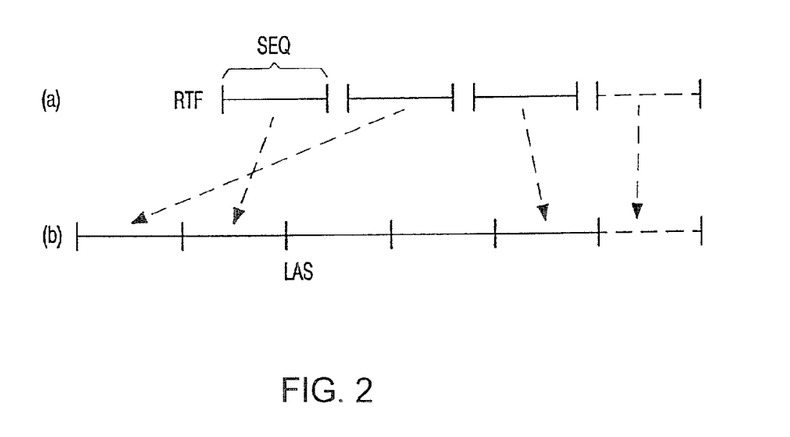
FIG. 2 represents generally the recording of blocks of information in sequence areas on an optical disc.

FIG. 2 illustrates recording of a video signal. In the video recorder subsystem 8 of FIG. 1, the video signal, which is a real time signal, is converted into a real-time file RTF or "clip file" as shown in the upper part of FIG. 2. The real-time file consists of a succession of signal block sequences SEQ for recording in corresponding (although fragmented) sequence areas. There is no constraint on the location of the sequence areas on the disc and, hence, any two consecutive sequence areas comprising portions of data of the video signal recorded may be anywhere in the logical address space LAS as shown in the lower part of FIG. 3. Within each sequence area, real time data is allocated contiguously. Each real time file represents a single A/V stream. The data of the A/V stream is obtained by concatenating the sequence data in the order of the file sequence.

Figure 3:
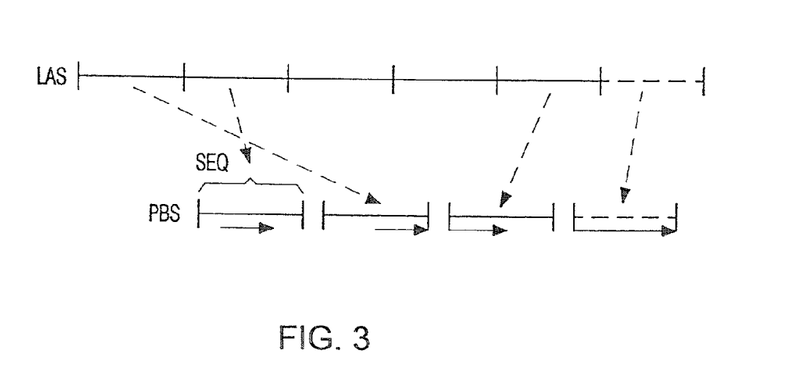
FIG. 3 represents generally the playback of information stored on a disc in the process of FIG. 2.

FIG. 3 illustrates playback of a video signal recorded on the disc 3. Playback of a video signal is controlled by means of a playback control (PBC) program stored elsewhere in the logical address space. In general, each PBC program defines a new playback sequence PBS, which may comprise an edited version of recorded video and/or audio segments, and may specify a sequence of segments from respective sequence areas. Pointers to the logical addresses of the individual sequences making up the desired sequence are directly or indirectly included in the PBC. As may be seen from comparison of FIGS. 2 and 3, the PBC required to recreate the original file sequence (from FIG. 2) re-orders the fragmented recorded segments to provide a playback frame succession corresponding to the original sequence.

Transport Stream Format

Figure 4:
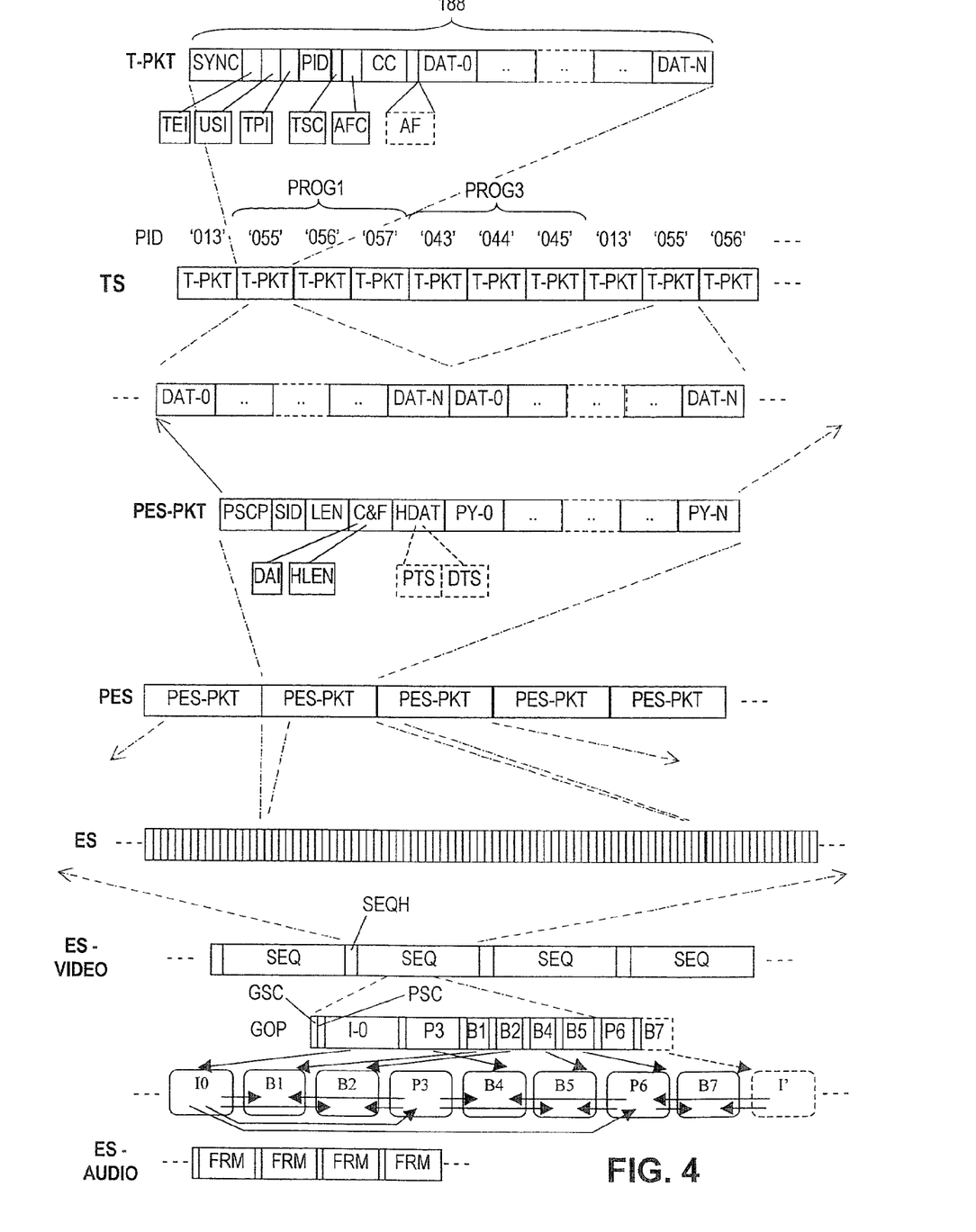
FIG. 4 illustrates the structure and key features of the MPEG Transport Stream (TS) format, which is the basis of recordings made by the present apparatus.

FIG. 4 illustrates the key features and structure of the MPEG-2 Transport Stream (TS) format. In the apparatus of FIG. 1, the data is stored on disc 3 in a TS-based format, similar to that in which it is received off-air, and in which it is passed over the digital interfaces 1 and 2. The TS is a continuous stream of transport packets labelled T-PKT in the drawing, each comprising 188 bytes of data, and having the format shown at the top of FIG. 4. Full details of the MPEG-2 Transport Stream, including Syntax, semantics and constraints applicable, will be found in ITU-T recommendation H.262||ISO/IEC 13818-1. Information about the MPEG-2 system is available online at http://www.mpeg.org. Briefly, each transport packet includes a header portion and a payload portion, the payload being indicated as bytes DAT-0 to DAT-N in the figure. The header begins with a distinctive synchronisation byte SYNC followed by various flags and control fields including a transport error indicator TEI, a payload unit start indicator USI, a transport priority indicator TPI, a packet identification PID, transport scrambling control field TSC, adaptation field control AFC and continuity counter CC.

The continuity counter CC is a 4-bit field incrementing with each Transport Stream packet for a given PID. CC wraps around to 0 after its maximum value. CC is not incremented when the adaptation field control of the packet indicates no payload for the packet. Continuity counter is a feature of the Transport Stream, not the Program Stream format, which is designed to allow devices to detect loss of packets in an error-prone channel. Packets following a lost packet generally have to be discarded until new synchronisation with new headers can be obtained. This makes editing TS streams more difficult however: the decoder has to be able to distinguish between discontinuities deliberately introduced by editing, and those introduced by transmission errors. These issues are addressed in the co-pending application "Methods and Apparatus For Editing Digital Video Recordings, and Recordings Made By Such Methods" (PHNL 000181) mentioned above.

Depending on the contents of field AFC, there may be present an adaptation field AF, occupying some of the space otherwise allocated to payload data. The adaptation field AF may for example contain a discontinuity indicator flag as defined in ISO/IEC 13818 for MPEG2. When set to '1', this flag indicates that the discontinuity state is true for the current Transport Stream packet. The discontinuity indicator is used to indicate two types of discontinuities, system time-base discontinuities and continuity counter discontinuities. In addition to optional data fields of pre-defined meaning, the adaptation field can be padded with stuffing bytes, so as to match the PES packet ends to TS packet boundaries.

A system time-base discontinuity is indicated by the use of the discontinuity indicator in Transport Stream packets of a PID designated as carrying a system time-base in the form of program clock reference PCR (refer to ISO/IEC 13818-1 Section 2.4.4.9). Quoting from that specification, when the discontinuity state is true for a Transport Stream packet of a PID designated as a PCR_PID, the next PCR in a Transport Stream packet with that same PID represents a sample of a new system time clock for the associated program. The discontinuity indicator shall be set to '1' in the packet in which the system time-base discontinuity occurs. The discontinuity indicator bit may also be set to '1' in Transport Stream packets of the same PCR_PID prior to the packet which contains the new system time-base PCR. In this case, once the discontinuity indicator has been set to '1', it shall continue to be set to '1' in all Transport Stream packets of the same PCR_PID up to and including the Transport Stream packet which contains the first PCR of the new system time-base.

In the example of the DVB digital broadcast format, the data rate of the TS Stream is around 40 (Mbits/s), while the typical data rate for an audio visual programme is less than 10 Mbits/s. Accordingly, as shown at TS in FIG. 4, various programmes PROG1, PROG3 can be multiplexed into a single transport stream. The field PID of each transport packet indicates one elementary stream to which that packet relates, these being interleaved in units of transport packets with plentiful other streams. One programme may for example comprise of a video stream (PID='055' in the example), an audio stream (PID='056') and teletext data stream (PID='057'). The correspondence between PID values and programmes, and the type of data carried with each PID is maintained in the form of programme specific information (PSI) tables. Periodically within the transport stream a programme association table PAT is carried in a special stream of transport packets with PID=0. The PAT in turn indicates for PROG1, PROG3 etc., which stream carries a programme mapping table PMT, which lists completely the different PID values relating to the single programme, and describes the content of each one (video, audio, alternative language audio, etc.). These tables and other data for control purposes are referred to both as system information and programme specific information (PSI).

To reproduce or record a given programme (PROG1) from the transport stream, the payload DAT-0 to DAT-N of successive transport packets having that PID is concatenated into a stream, and this stream carries packetised elementary stream packets PES-PKT, which are further defined in the MPEG-2 specification. Each PES packet begins with a distinctive packet start code prefix PSCP. Next in the PES packet header is a stream identifier SID which identifies the type of elementary stream (for example video, audio, padding stream or private stream). PES packets do not have a fixed length unless specified in a particular application, and a PES packet length field LEN specifies the number of bytes in the PES packet. Various control and flag fields C&F then follow, including for example a data alignment indicator DAI and a header length field HLEN. Various optional fields are then present within the header HDAT, depending on the value of associated flags in the C&F field for example, a presentation time stamp PTS may be present specifying the time with reference to a system clock at which a "presentation unit" picture, audio frame etc.) beginning in the present PES packet is due to be presented. In certain cases, presentation units are decoded in a different order from their presentation order, in which case a decoding time stamp DTS may also be present.

The payload PY-0 to PY-N of successive PES packets having the same SID forms a continuous elementary stream of data shown schematically at ES in FIG. 4. In the case of a video elementary stream ES-VIDEO, various picture sequences of clips SEQ are present, each including at its start a sequence header SEQH. Various parameters of the decoder including quantisation matrices, buffer sizes and the like are specified in the sequence header. Accordingly, correct playback of the video stream can only be achieved by starting the decoder at the location of a sequence header. Within the data for each sequence are one or more "access units" of the video data, each corresponding to a picture (field or frame depending on the application). Each picture is preceded by a picture start code PSC. A group of pictures GOP may be preceded by a group start code GSC, all following a particular sequence header SEQH.

As is well known, pictures in MPEG-2 and other modern digital formats are encoded by reference to one another so as to reduce temporal redundancy. Motion compensation provides an estimate of the content of one picture from the content already decoded for a neighbouring picture or pictures. Therefore a group of pictures GOP will typically comprise: an intra-coded "I" frame, which is coded without reference to other pictures; two or three "P" (predictive) coded pictures which are coded using motion vectors based on a preceding I frame; and bi-directional predicted "B" pictures, which are encoded by prediction from I and/or P frames before and after them in sequence. The amount of data required for a B picture is less than that required for a P picture, which in turn is less than that required for an I picture. On the other hand, since the P and B pictures are encoded with reference to other pictures, it is only the I pictures which provide an actual entry point for starting playback of a given sequence. Furthermore, it will be noted that for the GOP data, the I and P pictures are encoded before the corresponding B pictures, and then re-ordered after decoding so as to achieve the correct presentation order. Accordingly, B and P pictures are examples where the presentation time stamp PTS and decoding time stamp DTS may differ.

Finally in FIG. 4, there is shown a representation of an audio elementary stream ES-AUDIO. This comprises simple frames of data FRM with frame start codes. Various audio formats are permitted, varying in terms of sample rate (32 kHz, 48 kHz etc.) and also data rate (for example 32 kbits/s per second, or variable). These and other properties of the audio and video streams are encoded in the programme specific information PSI and in the PES packet headers.

Audio frames and video pictures having the same presentation time stamp PTS are those which are to be presented simultaneously at the output of the decoder. On the other hand, there is great freedom in the scheduling of packets of data from the different elementary streams, such that audio and video access units having the same PTS value can arrive in the transport stream TS up to one second apart.

System Target Decoder

In order to ensure that buffering and other aspects of a real decoder are able to decode each type of stream without breaks in the presented audio-visual programme, the MPEG-2 standard specifies a transport stream "system target decoder" (T-STD) model. There is also a program stream system target decoder (P-STD) model. Broadly, the T-STD is a model of a hypothetical real decoder having means for de-multiplexing the different elementary streams of the TS format, having decoders for each of the audio, video and system control types of data, and having buffers between the incoming stream and the decoder for holding data of each elementary stream between its arrival from a data channel and its actual time of decoding and presentation. The audio decoder in TS format has a smaller buffer than in the P-STD. Each main buffer in the T-STD is preceded by a transport buffer which acts to smooth the rather "bursty" data in the transport stream itself. While data for a given stream may arrive in a burst of several transport packets at a peak rate of 40 megabits per second, the average rate of such a stream, when taking into account the entire transport stream multiplex, is far lower. A "leak rate" is defined for the transport buffer so as to throttle the incoming data to a rate of 2 megabits per second, assuming that there is data to be passed into the main buffer.

Recording Operations—Modified TS Format for DVR

The basic idea is not to record the broadcast signal transparently in the form it is broadcast, but instead to reformat into a format suitable for playback from the disc. The inventors have recognised that:

The processing that has to be done to interpret the broadcast stream is sequential in nature. This is because watching TV in real-time is linear and the streams were designed with this in mind. Recording a signal to disc in real-time is also sequential, so all the information needed is available to the system at record time.

Playback from a disc is potentially non-sequential (due to random access, fast search, combining two recordings into one new one, skipping parts of a recording and so forth).

In general, playback may happen many times whereas recording happens just once.

From these observations, the aim of the present system is to do the processing needed to make playback and editing easier when the signal is recorded, rather than burden all playback and edit operations with unnecessary complexity and book-keeping.

Figure 5:
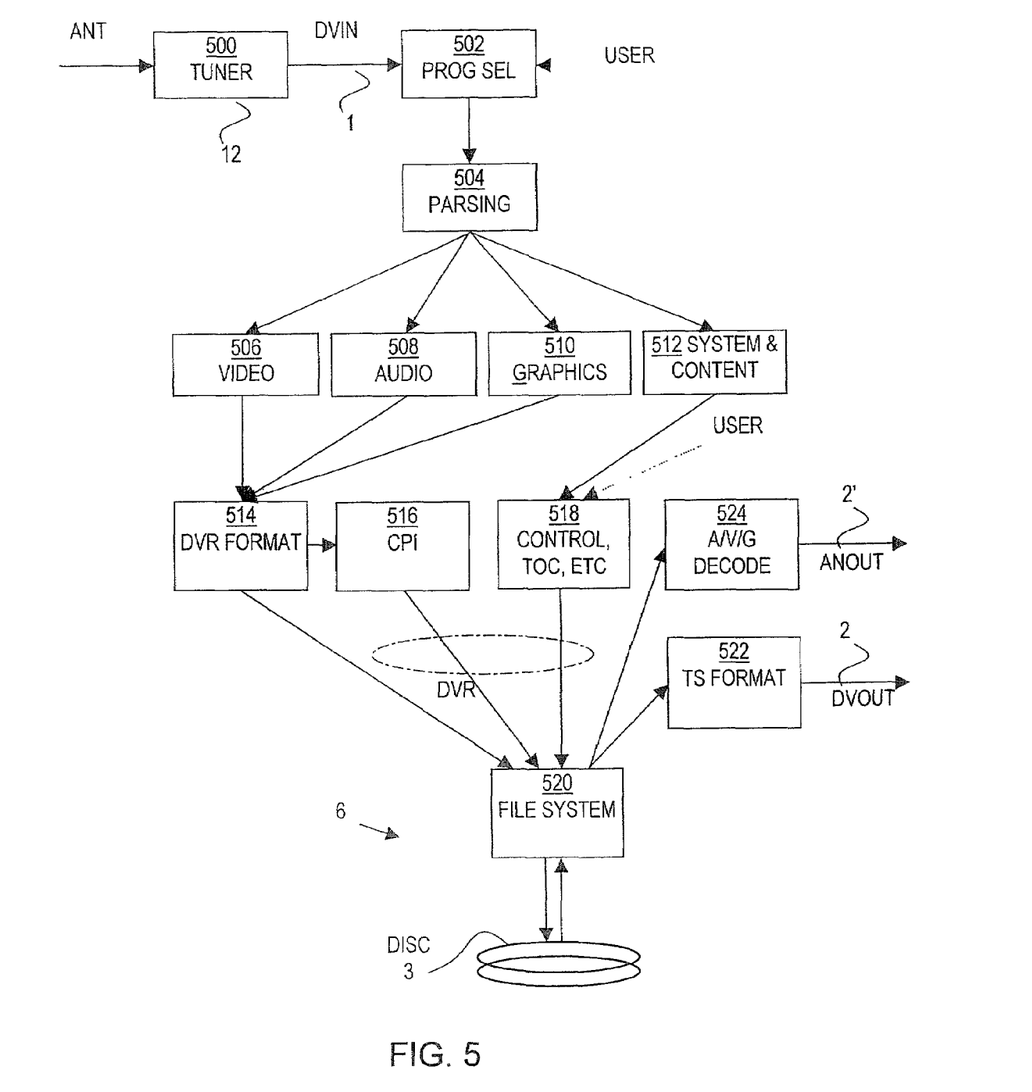
FIG. 5 illustrates various functions and their inter-relationships, in the process of making and replaying digital video recordings in the novel apparatus.

FIG. 5 illustrates various functions and their inter-relationships, in the process of making and replaying digital video recordings in the novel apparatus. It will be appreciated that the implementation of the functions and interconnections shown may be distributed between hardware and software as a matter of design choice. The apparatus will in practice comprise a selection of dedicated logic circuits and programmable processors for digital signal processing and control.

Beginning at the start of the recording process in FIG. 5, a broadcast signal ANT is received and decoded at 500 by a tuner function within the set top box (12 in FIG. 1). This provides a digital video input signal DVIN in MPEG-TS format, corresponding to the signal on input terminal 1 in FIG. 1. Within the recorder apparatus, function 502 selects a desired programme from any broadcast TS multiplex, filtering out the packets whose PID does not match the desired programme.

At 504, the filtered stream is parsed into various elementary streams 506 (video), 508 (audio), 510 (graphics) and 512 (system information). The video, audio and graphic streams are re-multiplexed at 514 into the real time file format for storage on disc 3 via the file system 520 of the disc subsystem 6. As part of this reformatting operation, lists of characteristic point information CPI are generated at 516, and also added to the file structure on the disc.

Based on the system information obtained at 512, not to mention options selected by the user of the apparatus, various control and indexing structure such as a table of contents, playback control programme, edits and so forth are generated at 518, for storage on a disc via the file system 520.

For playback, the user (or the system itself) can choose whether to obtain digital output signals DVOUT at terminal 2 (FIG. 1), or analogue signals ANOUT at another terminal 2'. To this end, at 522 the recorded real time files can be reproduced, using also the CPI and control information, and user input, to reproduce a TS format digital video output at step 522. Alternatively, at step 524, the same information from the disc can be decoded to produce the analogue output signals ANOUT, in accordance with the audio, video and graphics content of the recorded stream.

The novel aspects of the process will now be described in more detail.

Characteristic Point Information (CPI)

Additional information for identifying and navigating the recording is stored with the PBC or elsewhere on the disk. In particular, characteristic point information (CPI) is stored for each real-time file (clip file), as illustrated at 516 in FIG. 5. CPI comprises tables of locations within the recorded streams which are suitable for use as entry points in case of simple editing, interactive playback and trick play modes (fast picture search, for example). In general, CPI is used to determine the location of relevant data elements in a clip, without having to read and parse the clip itself. Indexing information like this is routinely present in Program Stream-based (PS) pre-recorded material, but is not generally provided in broadcast material, based on Transport Stream format. More detail of one form of characteristic point information (CPI) is contained in our above-referenced co-pending application PCT/EP99/08252 (PHN 17161 EP), not published at the present priority date. In order to be able to use CPI effectively, the total amount of CPI data should be limited. This allows all or most of the CPI data to be stored in system memory, so that there is no need to write or read CPI data to or from the disc during time-critical operations. Actual limitations might be specified for example in terms of points, or in terms of the actual size of CPI data on the disc.

For each clip file there is an accompanying CPI sequence, containing a list of all the characteristic points of that clip file. Clip files may be permitted to share data with other clip files to save duplicating data on disc, in a known manner. Similarly, CPI sequences can also share points with other CPI sequences.

Transport Stream PID Mapping

As explained above with reference to FIG. 4, within the MPEG-2 Transport Stream, the desired a programme consists of several elementary streams (e.g. Audio and Video and maybe others). Each elementary stream is carried in a stream of packets identified by a PID. Which PID number refers to each elementary stream is identified in the MPEG Program Specific Information (PSI) tables. These tables are the program association tables (PAT) and the program map table (PMT).

Figure 6:
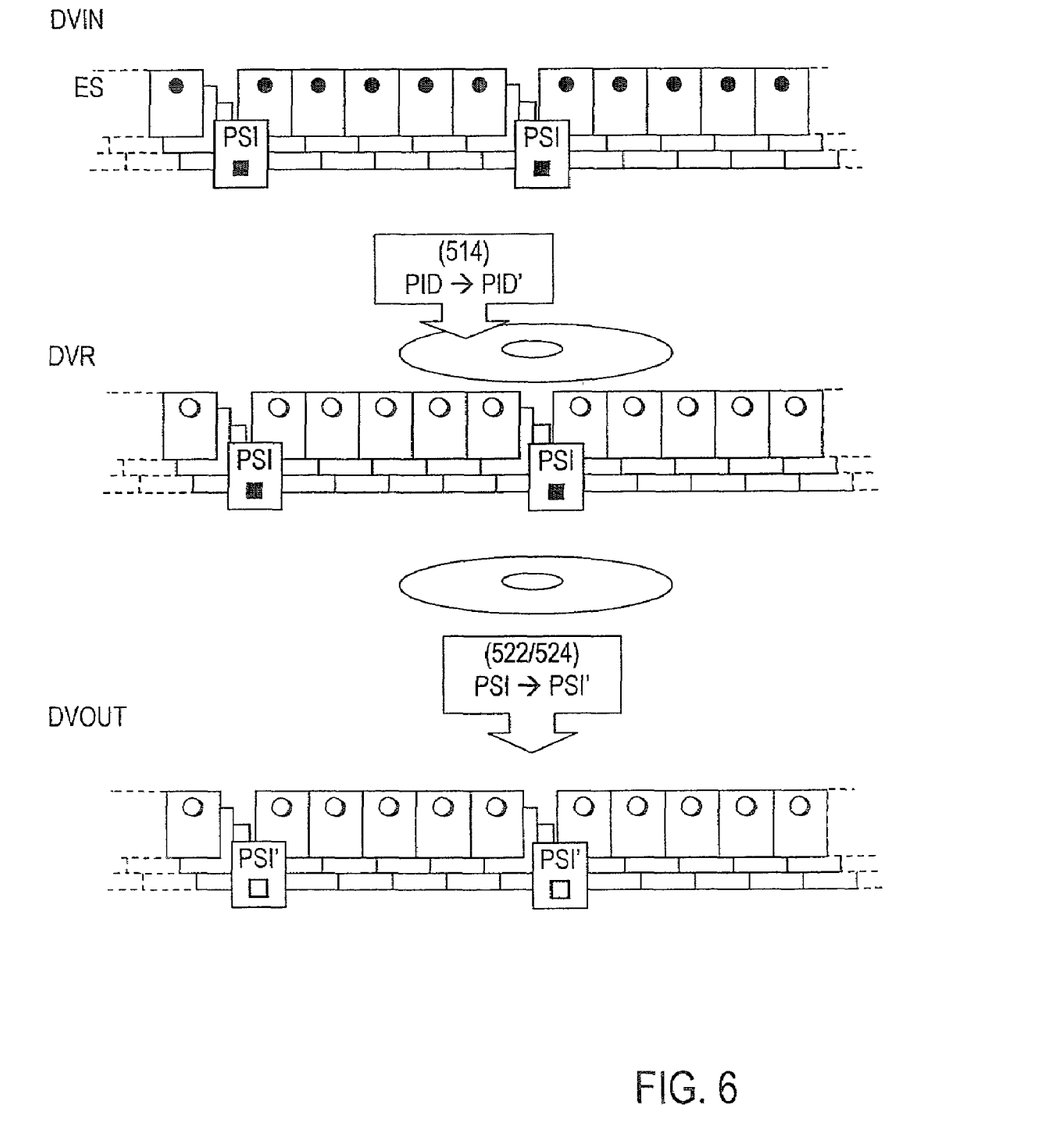
FIG. 6 illustrates a method of PID re-mapping in the apparatus.

FIG. 6 illustrates schematically the presence of programme specific information PSI, comprising PAT and PMT, interspersed effectively at random intervals in among the packets of elementary stream data ES. Recall that PSI is always carried in a special stream with PID='000'. The "original" PID of each packet, as received in the digital input signal DVIN is shown by a solid black circle ●. The "original" programme mappings are given periodically by PSI fields, marked with a solid black square ■. Every time PSI appears, the mapping of PID's to the elementary streams of the desired programme may change. The PAT/PMT allow the service provider to define and redefine the PID numbers that are used to identify program elements at will. A digital TV decoder (12 in FIGS. 1 and 5) has continually to check for updates to the PAT/PMT as it decodes the programme. The advantage for the service provider of this system is that it makes it easier to insert different content at different parts of his distribution network without central co-ordination.

This system works well when the decoder examines the broadcast stream sequentially. However, when we store the signal on a disc and then later wish to make random access to the stream we have a problem. Therefore, even making use of the characteristic point information CPI, merely jumping to the address in the stream of an I-picture does not work. Instead the player has to jump to the PAT and then the PMT sections that precede the I-picture to discover what PID mapping is locally in force. Then the player can jump to the I-picture address. This will slow down random access unacceptably.

Two approaches are now proposed to reformat the data before storing it on the disc. As noted above, during the recording all the information needed by the recorder to do the reformatting can be easily available.

In the first approach, (not illustrated) copies of the PAT/PMT are inserted immediately before each access unit (in video streams, say, each I-picture may begin an access unit for this purpose) as it is recorded. This requires a relatively small amount of processing. There are drawbacks to the first approach, however, namely:

It disturbs the timing of each packet in the MPEG buffer models. This may require recalculation of a number of parameters in the packet headers.

It wastes storage capacity on the disc (but a relatively small amount)

The resulting stream still may use many different PIDs. It is not clear how practical decoders will behave if the PID is updated very rapidly in succession, as may happen if we edit streams together.

The second approach, illustrated in FIG. 6, is to re-map the PIDs for every packet to a defined set of PIDs that are used for all recordings. During recording, the apparatus keeps track of the current PAT/PMT as usual, in order to filter out the unwanted streams. A simple table is established to map the PIDs specified by the (current) PAT/PMT, to the standard set of PIDs defined for recordings. The PID of every transport packet is modified according to the table so that the recorded streams have constant PID irrespective of changes in the PAT/PMT. The modified PIDs are indicated in the drawing by open circles ○ in the "DVR" format, as recorded on the disc 3.

With the standardised PIDs used for every part of a recording, random access is no longer a problem, because, whatever the PAT/PMT (■) in the received TS, the wanted PID will always be the same, in the recorded stream. Given that the original PAT/PMT (■) are still carried within the recorded stream, they would conflict with the modified PIDs (○) if fed to the decoder during playback. Accordingly, during playback, any PAT/PMT included in the stream read from the disk are replaced with modified PAT/PMT (open squares □ before being output from the apparatus at step 522 or fed to the local decoder at 524.

In a variation on the second approach, the PAT/PMT also can be re-mapped during recording. Naturally this involves more processing during the recording step, but leaves nothing to do at playback time but feed the streams to a standard decoder.

Advantages seen for the second approach are:

There is no impact on buffering strategies.

There is not a potential problem with practical decoders.

There is no impact on storage capacity.

Disadvantages of the second approach are:

Every packet recorded has to be modified.

The PAT and PMT that is transmitted needs to be changed during recording or playback, to reflect the new PIDs that are stored.

The first disadvantage is relatively minor, given that the entire stream is being parsed byte-by-byte to identify entry points, create CPI entries and so forth. A simple single-byte substitution leaves the exact packet structure of each stream intact. The second disadvantage goes slightly contrary to the ideal of eliminating complicated processing at playback time, but this is a relatively minor complication in consideration of the benefits gained overall.

PCR Replacement

The basic timing information for transport streams is provided by a sequence of time stamps known as the program clock reference (PCR). Within one multiplex several independent streams of PCRs can be transmitted. Programmes within a multiplex can either carry their own PCR or share the PCR of another program. PCRs are carried within the packet header (adaptation field) of a nominated PID. It is possible that the PCR PID is not one the elementary streams belonging to a recording (that is, it is one being discarded in step 502).

The apparent consequence of this would be that it is necessary to record the PCR PID (as in transparent recording of the entire multiplex). This may lead to the waste of a considerable amount of disc capacity and bandwidth, however. As one illustration, suppose that one broadcaster (for example company X) includes two programme channels (X1 and X2, say) within the multiplex, and suppose that channels X1 and X2 share a PCR PID. Now suppose we wish to record X2 audio and video. If the PCR PID for both channels is in the elementary stream that carries the vision for X1, for transparent recording we would have to record the vision for X1 as well as X2, nearly doubling the required storage capacity.

One solution would be to modify the packet headers of one of the existing elementary streams (for example, X2 video), so that it can carry the PCR. The disadvantage of this approach is that it disturbs the packet structure considerably, effectively requiring re-packetisation at the TS level. Any disruption of the packet structure potentially has implications for timing and buffer constraints.

The solution adopted in the novel apparatus described herein is to insert a "dummy" PID, that does not exist in the original broadcast and is created solely to support the recording, to carry the PCR. This "dummy" stream can have any unused PID, conveniently fixed for all recordings.

Figure 7:
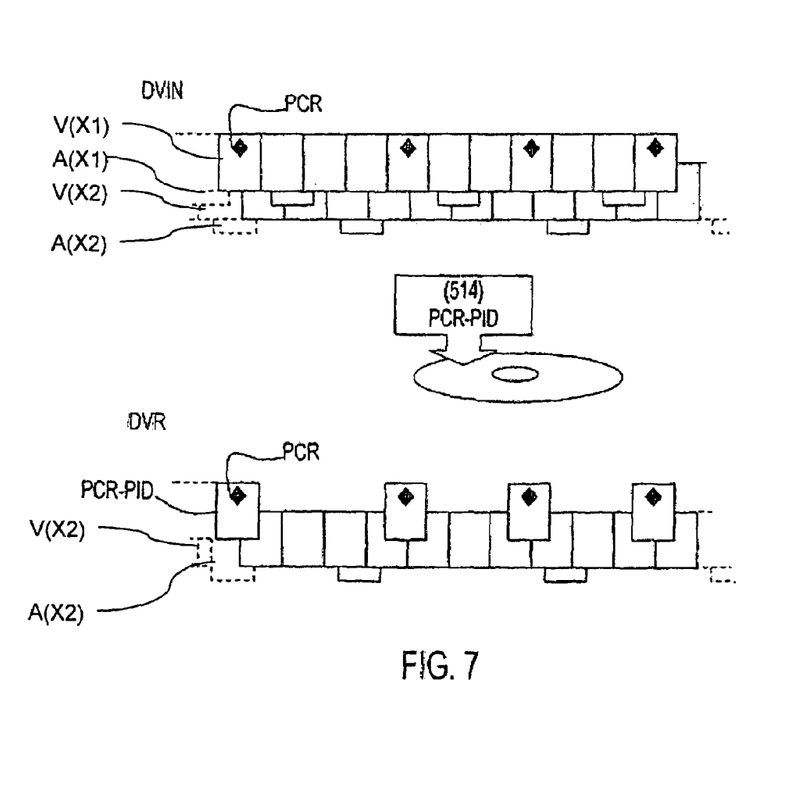
FIG. 7 illustrates the replacement of PCR fields from a discarded stream in the apparatus.

FIG. 7 illustrates the operation of PCR-PID insertion in the apparatus according to this solution. Elementary streams for X1 (video and audio) and for X2 (video and audio) are shown as part of the received TS format multiplex DVIN. The video stream for X1 labelled "V(X1)" includes periodically the PCR field, indicated by a diamond (♦). In the recorded format DVR, when recording X2 as described above, both streams V(X1) and A(X1) are omitted, while streams V(X2) and A(X2) are included in the DVR multiplex. A separate stream labelled PCR-PID is added, containing packets only when needed for the PCR (♦). The saving in data quantity is apparent compared with the stream V(X1). The degree of saving will be far greater than appears from the drawing, because the drawing exaggerates the ratio of PCR data and audio payload to video payload for the sake of illustration only.

Clearly in the preferred embodiment the behaviour with regard to PCR will be combined with the behaviour described above in relation to PID. These features are illustrated separately in FIGS. 6 and 7 for the sake of clarity only. The reader will appreciate that these drawings exaggerate the ratio of PSI and PCR data to audio/video payload and exaggerate the ratio of audio payload to video payload, for the sake of clear illustration.

ALTERNATIVE EMBODIMENTS/MODIFICATIONS

As will be generally understood, the preceding examples relate to frame-based rather than field-based editing: this is because the general unit of video encoding in MPEG is the frame. It will be recognised by the skilled person that MPEG compliance is not mandatory (as mentioned above) and that the techniques described herein may be also applied to non-MPEG field-based data.

There are also defined so-called "incognisant" formats, which may be broadcast. These follow the TS at the T-packet level, but are coded in non-standard fashion or, more likely, they are MPEG streams scrambled for security/pay per view. Unless the recorder incorporates the appropriate descrambler, these stream cannot be parsed to implement the extra steps proposed above.

The invention claimed is:

1. A method of processing data received in a transport stream format to produce a modified transport stream for recording on a recording medium to record wanted content of a selected audio-visual program, the received transport stream comprising a multiplex of elementary streams conveying not only the wanted content but also unwanted content of other programs not to be recorded, said elementary streams of data having been encoded, divided into elementary stream (ES) packets with packet headers, the ES packets further sub-divided into a plurality of smaller transport packets, and the transport packets of first and second elementary streams interleaved in the received transport stream with each other and with transport packets carrying data from neither stream, wherein the said modified transport stream is produced by:
   identifying and selecting received transport packets which correspond to the wanted content;
   recording the selected transport packets within a recording medium to form said modified transport stream, so as to preserve compliance with a transport stream target decoder model substantially without repacketizing or remultiplexing the streams; and
   recording auxiliary information on the same recording medium for use by a reproducing apparatus in gaining access to the content of the modified transport stream via any of a set of potential entry points throughout the wanted content.

2. The method as claimed in claim 1 wherein said auxiliary information includes information stored in a file separately from a file holding the modified transport stream.

3. The method as claimed in claim 2 wherein said auxiliary information comprises an index listing characteristic points within at least one of the wanted elementary streams, and is obtained by parsing the elementary stream to identify individual access units offering a valid entry point for decoding said at least one elementary stream.

4. The method as claimed in claim 3 wherein said characteristic points are defined with a frequency substantially greater than one per second on the presentation time scale.

5. The method as claimed in claim 3 wherein said characteristic points are defined with reference to a video elementary stream, each referring to an intra-coded picture data.

6. The method as claimed in claim 1 wherein at least part of said auxiliary information is recorded within the modified transport stream.

7. The method as claimed in claim 1 wherein the received transport stream occasionally includes stream mapping information identifying a transport packet ID code associated with each elementary stream, said stream mapping information being used to identify the wanted content and being subject to change throughout the received transport stream, and wherein at least part of said auxiliary information is created by parsing the received transport stream to extract the mapping information, and recorded so that current mapping information is accessible at each potential entry point without parsing the modified transport stream prior to the entry point.

8. The method as claimed in claim 6 wherein at least part of said auxiliary information comprises additional transport packets inserted at each potential entry point in the modified transport stream.

9. The method as claimed in claim 6, wherein at least part of said auxiliary information overwrites header information received within the transport packets, in order to define the modified transport stream.

10. The method as claimed in claim 9 wherein the received transport stream occasionally includes stream mapping information identifying a transport packet ID code associated with each elementary stream, said stream mapping information being used to identify the wanted content and being subject to change throughout the received transport stream, wherein said auxiliary information overwrites packet ID codes in the transport packets so as to re-map the wanted content to a uniform set of ID codes throughout the modified transport stream.

11. The method as claimed in claim 1, including the acts of:
   identifying in the received data an elementary stream conveying auxiliary data useful in playback of the program to be recorded; and
   in the case where the elementary stream conveying the auxiliary data is one conveying part of the unwanted content, generating a new elementary stream conveying the auxiliary data without the unwanted content.

12. The method according to claim 11 wherein the auxiliary data comprises clock reference data for synchronizing playback of the elementary streams.

13. The method as claimed in claim 1, wherein said elementary streams comprise at least video and audio of an audio-visual program to be recorded.

14. The method as claimed in claim 1, wherein said received transport stream is compliant with the MPEG transport stream specification.

15. The method as claimed in claim 1, further comprising:
   reproducing stored program segments with a timing different to that of the received transport stream, in accordance with user command, by reading the recorded auxiliary information and using it to enter and commence reproduction by reading said modified transport stream from a desired entry point.

16. The method as claimed in claim 15 wherein said reproducing is performed to effect a trick play mode of a frame-based elementary stream, using the auxiliary information to step through the program while presenting a subset of frames to a user, by reading said modified transport stream at a succession of entry points.

17. The method as claimed in claim 15 wherein said auxiliary information is read and used implicitly as part of a standard decoding of the modified transport stream.

18. The method as claimed in claim 15 wherein said auxiliary information is read and used to modify further the transport stream as reproduced from the recording medium, prior to standard decoding of the further modified transport stream.

19. A decoder arranged to decode a modified transport stream embedded in a signal and to select from the signal, wanted content of a selected audio-visual program, said modified transport stream comprising:

a multiplex of elementary streams conveying not only the wanted content but also unwanted content of other programs, said elementary streams of data having been encoded, divided into elementary stream (ES) packets with packet headers, the ES packets further sub-divided into a plurality of smaller transport packets, and the transport packets of first and second elementary streams interleaved in the transport stream with each other and with transport packets carrying data from neither stream;

the decoder being arranged to identify and select transport packets which correspond to the wanted content and to preserve compliance with a transport stream target decoder model substantially without repacketizing or remultiplexing the streams, and to utilize auxiliary information to gain access to the content of the modified transport stream via any of a set of potential entry points throughout the wanted content.

20. The decoder as claimed in claim 19 wherein said modified transport stream has been reproduced from a recording medium by reproducing stored program segments with a timing different to that of the received transport stream, in accordance with a user command, by reading the recorded auxiliary information and using the recorded auxiliary information to enter and commence reproduction by reading said modified transport stream from a desired entry point.

21. An apparatus for providing a multiplex of elementary stream data received in a transport format comprising a multiplex of elementary streams conveying not only wanted content but also unwanted content of other programs, said elementary streams of data having been encoded, divided into elementary stream (ES) packets with packet headers, the ES packets further sub-divided into a plurality of smaller transport packets, and the transport packets of first and second elementary streams interleaved in the received transport stream with each other and with transport packets carrying data from neither stream, the apparatus comprising means specifically adapted to generate a modified transport stream by identifying and selecting received transport packets which correspond to the wanted content, providing the selected transport packets to form said modified transport stream, so as to preserve compliance with a transport stream target decoder model substantially without repacketizing or remultiplexing the streams; and providing auxiliary information as a part of said modified transport stream for use by a reproducing apparatus in gaining access to the content of the modified transport stream via any of a set of potential entry points throughout the wanted content.

22. The apparatus as claimed in claim 21 further comprising means for reproducing said modified transport stream by reproducing program segments with a timing different to that of the received transport stream, in accordance with user command, by reading the auxiliary information and using the auxiliary information to enter and commence reproduction by reading said modified transport stream from a desired entry point.

23. A method of processing a received data stream to produce a modified stream for recording on a recording medium to record wanted content of a selected audio-visual program, the received data stream comprising a multiplex of elementary streams conveying not only the wanted content but also unwanted content of other programs not to be recorded, the method comprising:

identifying and extracting from the received data stream the elementary data stream(s) conveying the wanted content;

identifying in the received data an elementary stream conveying auxiliary data useful in playback of the program to be recorded;

in the case where the elementary stream conveying the auxiliary data is one conveying part of the unwanted content, generating a new elementary stream conveying the auxiliary data without that part of the unwanted content; and multiplexing together the elementary stream(s) extracted from the received stream with the new elementary stream to form said modified data stream for recording.

24. The method according to claim 23 wherein the auxiliary data comprises a clock reference data for synchronizing playback of the audio-visual program.

25. The method according to claim 23 wherein the received data stream is an MPEG-compliant Transport Stream as defined in ISO/IEC 13818-1 and the auxiliary data comprises the Program Clock Reference as defined therein.

26. A method of processing data received in a transport stream format of elementary streams of data, to produce a modified transport stream for recording on a recording medium to record wanted content of a selected audio-visual program, said elementary streams of data having been encoded, divided into elementary stream packets with packet headers, the ES packets further sub-divided into a plurality of smaller transport packets, and the transport packets of the first and second elementary streams interleaved in the received transport stream with each other and with transport packets carrying data from neither stream, and wherein the received transport stream occasionally includes stream mapping information identifying a transport packet ID code associated with each elementary stream, said stream mapping information being subject to change throughout the received transport stream, wherein the said modified transport stream is produced by:

identifying received transport packets which correspond to the wanted content using said stream mapping information;

modifying packet ID codes in the transport packets so as to re-map the wanted content to a uniform set of ID codes according to content type of the transport packets;

recording the selected transport packets within a recording medium to form said modified transport stream, thereby to preserve compliance with a transport stream target decoder model and provide a greater number of potential entry points than in the received stream.

27. A method of processing data received in a transport stream format of elementary streams of data, to produce a modified transport stream for recording on a recording medium to record wanted content of a selected audio-visual program as wanted content, said elementary streams of data having been encoded, divided into elementary stream packets with packet headers, the ES packets further sub-divided into a plurality of smaller transport packets, and the transport packets of the first and second elementary streams interleaved in the received transport stream with each other and with transport packets carrying data from neither stream, and wherein the received transport stream occasionally includes stream mapping information identifying a transport packet ID code associated with each elementary stream, said stream mapping information being subject to change throughout the received transport stream, wherein the said modified transport stream is produced by:

identifying received transport packets which correspond to the wanted content using said stream mapping information;

parsing the receive transport packets to obtain said mapping information for potential entry points throughout at least one of the elementary streams;

recording the selected transport packets together with said auxiliary information within a recording medium to form said modified transport stream, thereby to preserve compliance with a transport stream target decoder model and while providing a greater number of potential entry points than in the received stream.

28. The method as claimed in claim 26 wherein at least part of said auxiliary information comprises additional transport packets inserted to reproduce current mapping information at each potential entry point in the modified transport stream.

29. An apparatus for recording a multiplex of elementary stream data received in a transport format comprising a multiplex of elementary streams conveying not only wanted content but also unwanted content of other programs not to be recorded, the apparatus comprising means specifically adapted to generate and record a modified transport stream by identifying and extracting from the received data stream the elementary data stream(s) conveying the wanted content, identifying in the received data an elementary stream conveying auxiliary data useful in playback of the program to be recorded, in the case where the elementary stream conveying the auxiliary data is one conveying part of the unwanted content, generating a new elementary stream conveying the auxiliary data without that part of the unwanted content, and multiplexing together the elementary stream(s) extracted from the received stream with the new elementary stream to form said modified data stream for recording.

30. An apparatus as claimed in claim 29 further comprising means for reproducing said modified transport stream by reproducing stored program segments with a timing different to that of the received transport stream, in accordance with user command, by reading the recorded auxiliary information and using the recorded auxiliary information to enter and commence reproduction by reading said modified transport stream from a desired entry point.

31. An apparatus for recording a multiplex of elementary stream data received in a transport format of elementary streams of data, said elementary streams of data having been encoded, divided into elementary stream packets with packet headers, the ES packets further sub-divided into a plurality of smaller transport packets, and the transport packets of the first and second elementary streams interleaved in the received transport stream with each other and with transport packets carrying data from neither stream, and wherein the received transport stream occasionally includes stream mapping information identifying a transport packet ID code associated with each elementary stream, said stream mapping information being subject to change throughout the received transport stream, the apparatus comprising means specifically adapted to generate and record a modified transport stream by identifying received transport packets which correspond to wanted content using said stream mapping information, modifying packet ID codes in the transport packets so as to re-map the wanted content to a uniform set of ID codes according to content type of the transport packets, and recording the selected transport packets within a recording medium to form said modified transport stream, thereby to preserve compliance with a transport stream target decoder model and provide a greater number of potential entry points than in the received stream.

32. An apparatus for recording a multiplex of elementary stream data received in a transport format of elementary streams of data, said elementary streams of data having been encoded, divided into elementary stream packets with packet headers, the ES packets further sub-divided into a plurality of smaller transport packets, and the transport packets of the first and second elementary streams interleaved in the received transport stream with each other and with transport packets carrying data from neither stream, and wherein the received transport stream occasionally includes stream mapping information identifying a transport packet ID code associated with each elementary stream, said stream mapping information being subject to change throughout the received transport stream, the apparatus comprising means specifically adapted to generate and record a modified transport stream by identifying received transport packets which correspond to wanted content using said stream mapping information, parsing the receive transport packets to obtain said mapping information for potential entry points throughout at least one of the elementary streams, and recording the selected transport packets together with said auxiliary information within a recording medium to form said modified transport stream, thereby to preserve compliance with a transport stream target decoder model and while providing a greater number of potential entry points than in the received stream.

33. A method comprising:

identifying and selecting transport packets which correspond to wanted content of a wanted program from a multiplexed transport stream comprising multiple elementary streams conveying not only the wanted content of the wanted program but also unwanted content of other programs that are not wanted, the elementary streams of data having been encoded and divided into elementary stream packets with packet headers, the ES packets being further sub-divided into a plurality of smaller transport packets, and the transport packets of a first and second elementary streams being interleaved in the multiplexed transport stream with each other and with transport packets carrying data from neither the first or second stream;

forming a modified transport stream containing the selected packets so as to preserve compliance with a transport stream target decoder model substantially without repacketizing or remultiplexing the streams;

generating auxiliary information for use by a reproducing apparatus in gaining access to the content of the modified transport stream via any of a set of potential entry points throughout the wanted content; and     transmitting the modified transport stream together with the auxiliary information into a medium.

34. The method of claim 33 wherein the medium includes one or more of a record carrier, and a cable, and a satellite.

* * * * *